US012284499B1

(12) United States Patent
Lovitt et al.

(10) Patent No.: US 12,284,499 B1
(45) Date of Patent: Apr. 22, 2025

(54) AUGMENTED HEARING VIA ADAPTIVE SELF-REINFORCEMENT

(71) Applicant: Meta Platforms Technologies, LLC, Menlo Park, CA (US)

(72) Inventors: Andrew Lovitt, Redmond, WA (US); Nicholas William Metzar, Beaverton, OR (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 214 days.

(21) Appl. No.: 18/086,826

(22) Filed: Dec. 22, 2022

Related U.S. Application Data

(60) Provisional application No. 63/348,604, filed on Jun. 3, 2022.

(51) Int. Cl.

| | |
|---|---|
| ***H04R 3/12*** | (2006.01) |
| ***G10L 25/51*** | (2013.01) |
| ***H04R 1/40*** | (2006.01) |
| ***H04R 3/00*** | (2006.01) |

(52) U.S. Cl.
CPC ................ *H04R 3/12* (2013.01); *G10L 25/51* (2013.01); *H04R 1/403* (2013.01); *H04R 1/406* (2013.01); *H04R 3/002* (2013.01); *H04R 2430/01* (2013.01)

(58) Field of Classification Search
CPC .......... H04R 3/12; H04R 1/403; H04R 1/406; H04R 3/002; H04R 2430/01; G10L 25/51
See application file for complete search history.

(56) References Cited

U.S. PATENT DOCUMENTS

| | | |
|---|---|---|
| 8,208,650 B2 | 6/2012 | Joho et al. |
| 9,117,455 B2 | 8/2015 | Tracey et al. |
| 9,264,824 B2 | 2/2016 | Pruthi et al. |

(Continued)

FOREIGN PATENT DOCUMENTS

WO WO-2006058361 A1 * 6/2006 ............... H03G 3/32

OTHER PUBLICATIONS

Benjamin.T., "How Signia's Own Voice Processing Changes the Hearing Aid Experience," Hearing aid know, Sep. 2, 2018, [Retrieved on Mar. 5, 2023], 11 pages, Retrieved from the Internet: URL: https://www.hearingaidknow.com/how-own-voice-processing-changes-the-hearing-aid-experience.

(Continued)

*Primary Examiner* — Mark Fischer
(74) *Attorney, Agent, or Firm* — Potomac Law Group, PLLC

(57) ABSTRACT

An audio system receives sounds from a local area with a set of sensors. The audio system analyzes the sounds to identify an amount of background noise in the environment. The audio system may also identify target sound in the environment, such as voice from a nearby speaker, to reinforce. The amount of background noise is then used to adaptively set a level of reinforcement for the target sound. In low-noise environments, the target sound may be minimally, or not reinforced, while in high-noise environments a reinforcement sound signal may be generated with the target sound so that a transducer array may generate reinforcing sounds for the target sound and increase its contrast with the noise in the environment. By applying the reinforcement dynamically, the system automatically adjusts for different sounds and environments.

20 Claims, 8 Drawing Sheets

500

(56) References Cited

U.S. PATENT DOCUMENTS

| | | | | |
|---|---|---|---|---|
| 10,863,288 | B2 | 12/2020 | Ungstrup | |
| 11,184,714 | B2 | 11/2021 | Guo et al. | |
| 2022/0053281 | A1* | 2/2022 | Sheaffer | H04R 1/1008 |
| 2022/0322015 | A1* | 10/2022 | Song | G10L 25/84 |
| 2023/0276182 | A1* | 8/2023 | Zhang | H04R 25/558<br>381/315 |

OTHER PUBLICATIONS

Froehlich M., et al., "Perception of Own Voice Wearing Hearing Aids: Why 'Natural' is the New Normal," Apr. 30, 2018 [Retrieved on Mar. 5, 2023], 13 pages, Retrieved from the Internet: URL: https://www.audiologyonline.com/articles/perception-own-voice-wearing-hearing-22822.

* cited by examiner

AUGMENTED HEARING VIA ADAPTIVE SELF-REINFORCEMENT

CROSS-REFERENCE TO RELATED APPLICATIONS

This application claims the benefit of U.S. Provisional Application No. 63/348,604, filed Jun. 3, 2022, which is incorporated by reference in its entirety.

FIELD OF THE INVENTION

This disclosure relates generally to hearing augmentation, and more specifically to enhancing a sound from a local area by presenting a reinforcing sound that corresponds to the sound from a desired sound source.

BACKGROUND

Conventional hearing augmentation (e.g., by hearing aids) for a hearing device simply adjusts a gain to an audio signal being passed through to an ear of a user of the hearing device. In this manner, sounds from a sound source of interest as well as background noise may be amplified, even though the user is only interested in hearing sounds from the sound source of interest. Moreover, the gain is generally applied regardless of a level of background noise actually present in an environment. This can create artificial or unwanted experiences for a user, particularly in environments in which low environmental noise is present. Similarly, presenting the same gain does not account for different types of environments in which applying the same gain may be undesirable. Finally, conventional systems for hearing devices may apply such a gain based on the manual user interactions to enable or disable the gain.

SUMMARY

An audio system (e.g., a hearing device worn near a user's ear, such as a hearing aid, glasses, or headset) applies a gain to at least a portion of received audio automatically based on a detected background noise level in an environment. In some embodiments, at low amounts of background noise, the audio system my apply no gain and apply reinforcement when the background noise is at a higher level. The level of reinforcement may thus increase as a function for background noise. In some embodiments the reinforcement may stop when the background noise reaches a high enough level that the reinforcement may no longer improve hearing of desired audio. In general, as the background noise level increases, the audio system may apply an increasing gain, increasing the distinction between received sounds from a desired sound source when the background noise is high. This enables the device to adaptively determine and apply a level of reinforcement for desired external sounds based on the background (e.g., environmental) noise level. The level of reinforcement may also be based on a type of the environment and other factors. The sound to be reinforced may be associated with a sound source, such as a speaker. The level of reinforcement may be used to generate a reinforcement audio signal, for example, to recreate or amplify sounds of the sound source. The reinforcement audio signal may then be generated by a speaker array and played for a hearer to improve the hearer's ability to distinguish the desired sound from the background noise.

Figure 1A:
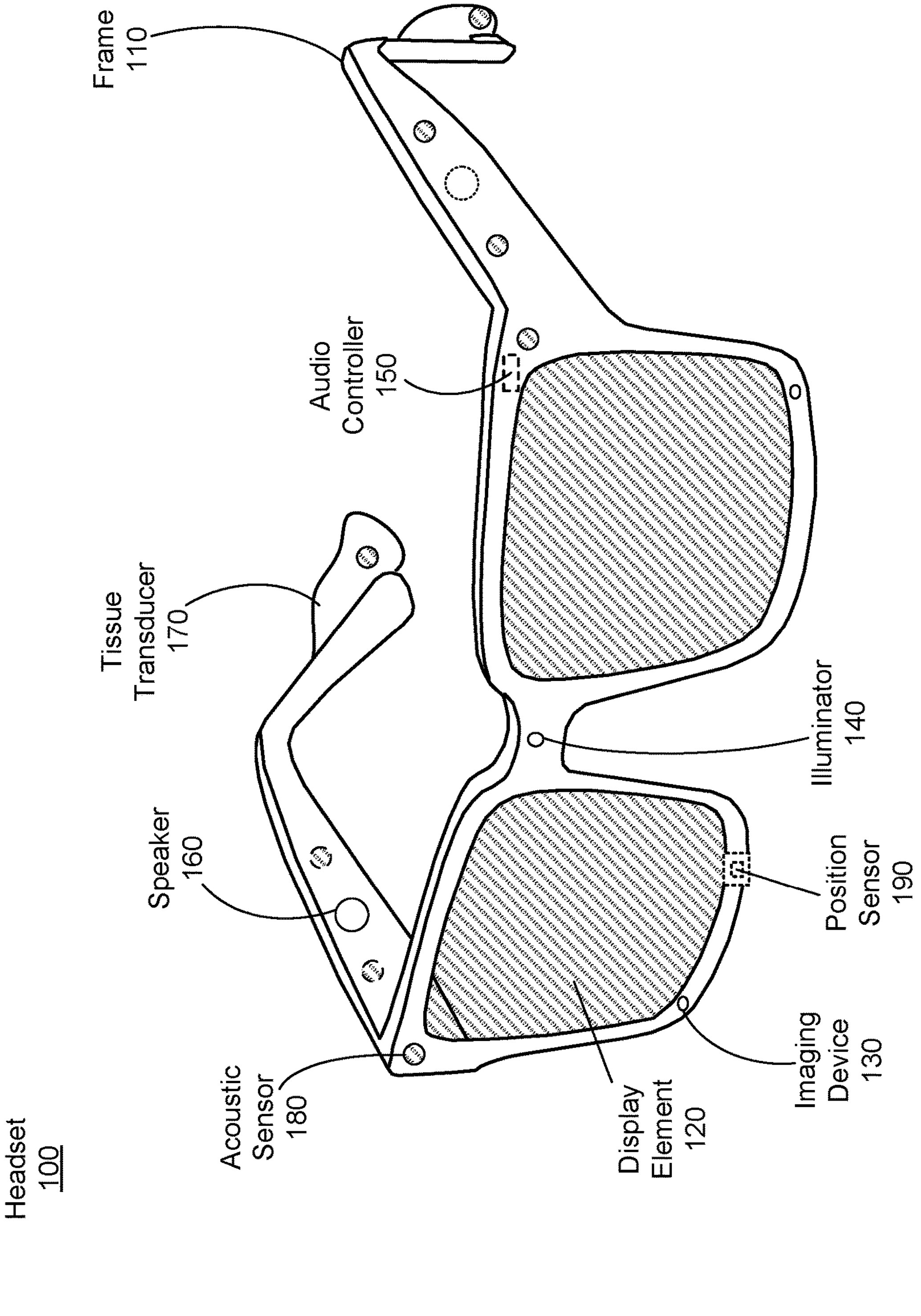
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Described herein is an audio system that augments hearing via adaptive self-reinforcement. The audio system may be integrated into a headset, in-ear device(s), wearable device(s), or other type of audio system suitable for augmenting a sound source in an environment with background noise. Self-reinforcement is a process of enhancing a sound from a local area of the audio system by presenting a reinforcing sound that corresponds to the sound from the desired sound source. The reinforcing sound may be provided to an ear of a user at the same time the sound from the local area (e.g., ambient noise) reaches the ear of the user. In open ear devices (e.g., a headset), the reinforcing sound is presented such that it substantially overlays and combines (e.g., constructively) with the sound from the local area. In closed ear devices (e.g., in-ear devices), the closed ear device attenuates all sounds from the local area and presents the reinforcing sound to the user (who may also receive a reduced level of ambient noise). Self-reinforcement may be used for improving the hearer's ability to focus on various sound sources, such as to help the user focus on speech from other users (e.g., to improve focus on a conversation).

The audio system may include, e.g., a sensor array, a transducer array, and a controller. As a general overview, the sensor array may include one or more sensors that receive sounds from the local area, which may include a sound source and background noise. The controller analyzes the received sounds to generate a reinforcement audio signal, such that reinforcement audio may be generated by the transducer array to reinforce the sound from the sound source in the local area. The controller may adaptively and dynamically generate and apply the reinforcement audio signal based on the level of background noise (and/or with additional factors) to improve distinction by the user of the sound source from the background noise. Various examples of the audio system and further details for dynamically adjusting the level of reinforcement for the sound source are provided below.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. The headset 100 is one example device that may include embodiments of the audio system discussed below and adaptively augment sound based on background noise. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear-piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, reinforce sounds from a sound source, or some combination thereof.

Figure 2:
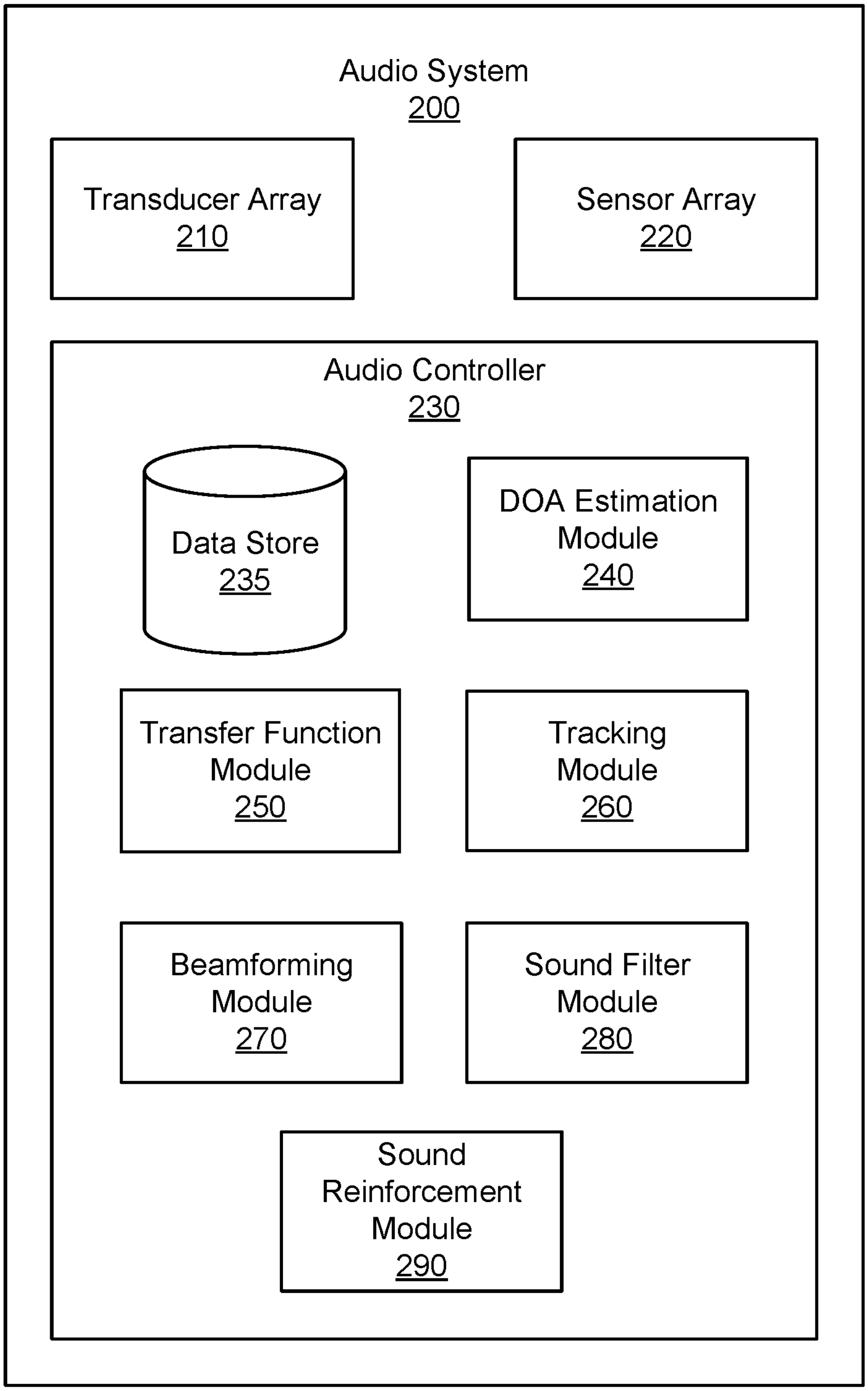
FIG. 2 is a block diagram of an audio system, in accordance with one or more embodiments.

In particular, the audio components of the headset may include the audio components as shown in FIG. 2 and adaptively augment sounds from the local area based on the level of background noise. Further details of the adaptive augmentation are further discussed with respect to FIGS. 2-5.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
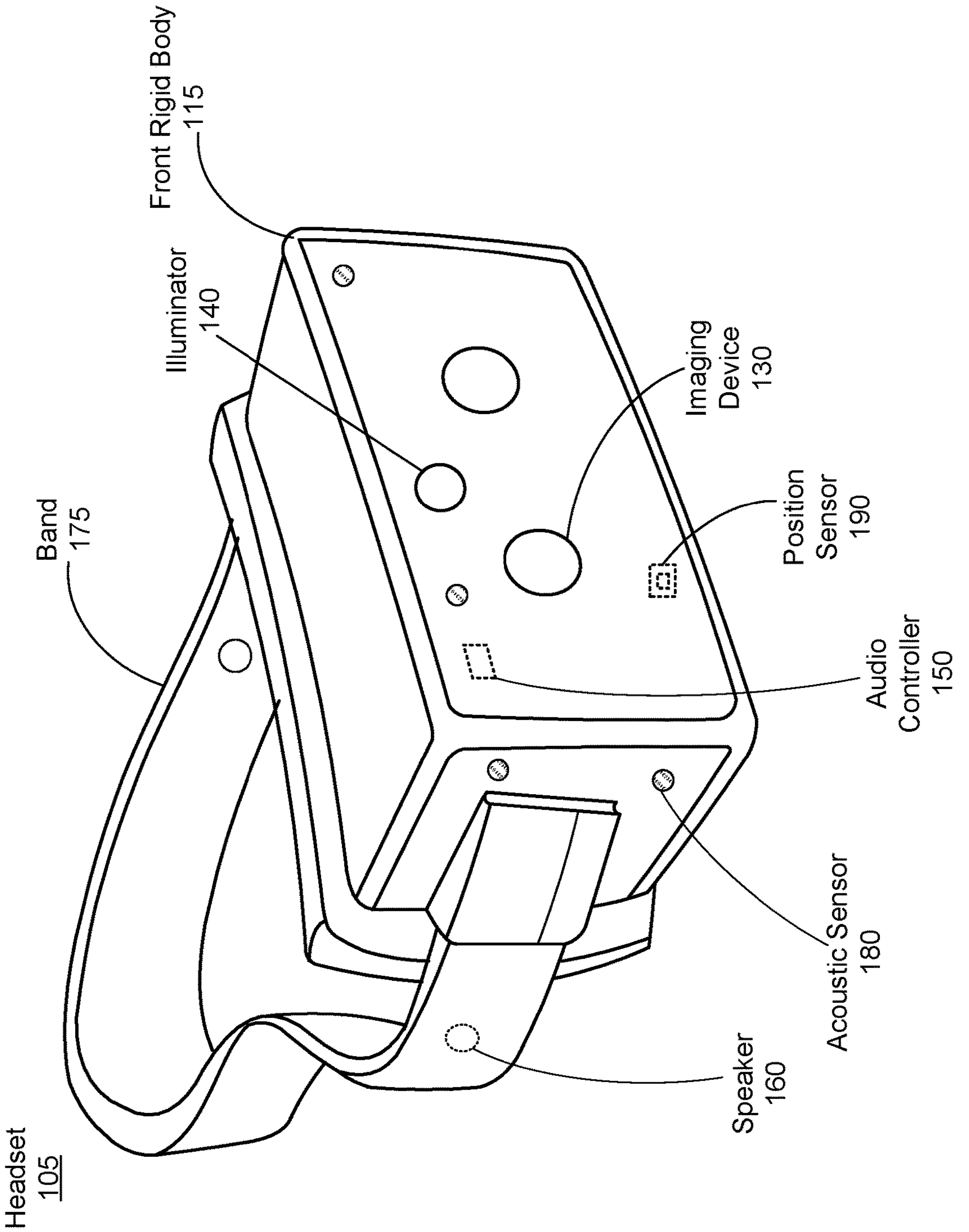
FIG. 1B is a perspective view of a headset implemented as a head-mounted display, in accordance with one or more embodiments.

FIG. 1B is a perspective view of a headset 105 implemented as a HMD, in accordance with one or more embodiments. The headset 105 is another example device that may include configurations of the audio system discussed below. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

FIG. 2 is a block diagram of an audio system 200, in accordance with one or more embodiments. The audio system in FIG. 1A or FIG. 1B may be an embodiment of the audio system 200. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here. Embodiments of the audio system 200 include systems with more or fewer components and in different configurations than the examples of FIGS. 1A-B and may thus lack imaging devices, displays, position sensors, etc., as shown in FIGS. 1A-B. The audio system 200 may be implemented in various additional types of devices, such as various types of wearable audio devices like over-ear devices, in-ear devices, headphones, earbuds, hearing aids, and so forth. Embodiments may include connected devices that may connect to other controllers for receiving audio content wirelessly, or may be stand-alone devices that adaptively augment sounds without presentation of other or additional audio content (e.g., a traditional hearing aid).

The audio system 200 includes an audio controller 230 that augments sound from a target sound source to aid a user in distinguishing sound from the target sound source from background noise in a local area. The acoustic sensors in the sensor array 220 receive sounds from the local area including sound from one or more sound sources in the local area (e.g., a room) as well as some amount of background noise. Background noise is noise that is not of interest to the user and can make it difficult for a user to understand sound from one or more target sound sources (i.e., sound sources of interest to the user). The audio controller 230 determines a level of background noise and determines whether and to what extent to augment the target sound source based on the level of background noise. The audio controller 230 generates a reinforcement audio signal that may then be output by the transducer array 210 (i.e., to reinforce the target sound source and thus aid the hearer in distinguishing sound from the target sound source from the background noise.)

The background noise, however, may only sometimes interfere with a user's ability to adequately hear the sound source and may depend on the amount of background noise. For example, relatively low background noise environments or environments in which the target sound source is relatively loud compared to the background noise may mean that no augmentation is beneficial to the user (and in some situations, augmentation may degrade the user's experience). As such, the audio controller 230 generates a reinforcement audio signal that may generally increase the reinforcement audio signal in higher-background noise environments or where the signal-to-noise ratio (SNR) of the sound source is relatively low. The extent of augmentation may thus vary according to the particular conditions around the audio system 200.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range. The transducers may be integrated into a frame of the headset, integrated into an in-ear device to provide audio content to an ear drum of the user, or some combination thereof.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230 and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, acoustic wave sensors, sound transducers, or similar sensors that are suitable for detecting sounds and the sensor array may include any suitable combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, a sound filter module 280, and a sound reinforcement module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The audio controller 230 processes information from the sensor array that describes sounds detected by the sensor array and may generate signals for output by the transducer array 210. The controller may comprise a processor and a computer-readable storage medium. The controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the transducer array, or some combination thereof.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 may be personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 6).

The sound filter module 280 provides the sound filters to the transducer array 210. In some embodiments, the sound filters may cause positive or negative amplification of sounds as a function of frequency.

The sound reinforcement module 290 analyzes the received sound and adaptively generates a reinforcement audio signal for a sound source. The sound reinforcement module 290 identifies background noise in the sound captured by the acoustic array. The sound reinforcement module 290 may, e.g., use beamforming and direction of arrival to identify one or more sound sources within the local area (e.g., as outputs from the DOA estimation module 240 and beamforming module 270). The sound reinforcement module 290 is shown here as a separate module in this configuration, but in other implementations may be implemented with other functional components of the controller, such as the beamforming module 270.

The audio controller 230 is configured to generate a reinforcement audio signal for each of the one or more sound sources in accordance with the corresponding levels of reinforcement. In open ear devices (e.g., a headset) the reinforcing sound is generated such that, when presented, it may substantially overlay and constructively combine with the sound from the local area. In closed ear devices (e.g., in-ear devices), the closed ear device attenuates sounds from the local area. Accordingly, in these configurations, the audio controller 230 (e.g., via the sound reinforcement module 290) generates the reinforcing sound along with some level of reduced background noise. The audio controller 230 then provides the generated reinforcement audio signal(s) to the transducer array 210 for presentation.

To determine a reinforcement audio signal, the sound reinforcement module 290 may determine a background noise level and the sound to be reinforced (e.g., from a target sound source). The sound to be reinforced may be identified as a specific sound source or may be sound originating from a particular direction (e.g., in front of the user), in a particular frequency (1-10 kHz), a particular type (e.g., spoken words), or a combination of these (e.g., spoken words from a specific source in front of the user). A sound source to be reinforced may also be referred to as a "target" sound source or a "desired" sound source. The sound to be reinforced may be referred to as a "target sound." The background noise level may be defined in one embodiment as the sounds received by the sensor array 220 that are not associated with a target sound/target sound source.

The sound reinforcement module 290 may identify which sound source is a target sound source of interest to the user based on, e.g., an express user input, orientation of the user's head (e.g., measured via position sensors on an in-ear device and/or headset) relative to the target sound source, etc. For example, if the sound reinforcement module 290 determines that the user is looking at (and/or back and forth from) one or more particular sound sources, the controller may designate the one or more particular sound sources as target sound source(s), and other captured sounds as background noise. The target sound source(s) may also be identified based on a classification of the target sound source based on received sound from the particular sound source, for example identifying a "human speaker" as a classification of a target sound source. In some embodiments, the audio controller 230 may classify additional sound source types and designate these as background noise based on the classification. For example, the sound reinforcement module 290 may identify noises from a fan, traffic, etc., as noise sources with the respective types and then automatically designate them as background noise.

The sound reinforcement module 290 determines an amount of background noise in the captured sound from a local area (e.g., how loud the sound from non-target sources is). The sound reinforcement module 290 actively monitors the amount of background noise and/or target sound source such that the sound reinforcement module 290 may automatically adjust reinforcement of the target sound source and dynamically compensate for changes in the background noise.

The sound reinforcement module 290 is configured to determine a level of reinforcement to be applied to received sound from the one or more sound sources based in part on the amount of background noise in a local area. For example, if background noise is below a threshold value and the target sound is above a threshold level, no reinforcement is applied to the sound. Similarly, if the background noise increases in the local area above a threshold value, the target sound source may then be reinforced as it may now be more difficult for a user to distinguish the target sound source from the background noise. Additional details of the generation of the reinforcement audio signal are discussed in FIGS. 3-5.

Figure 3:
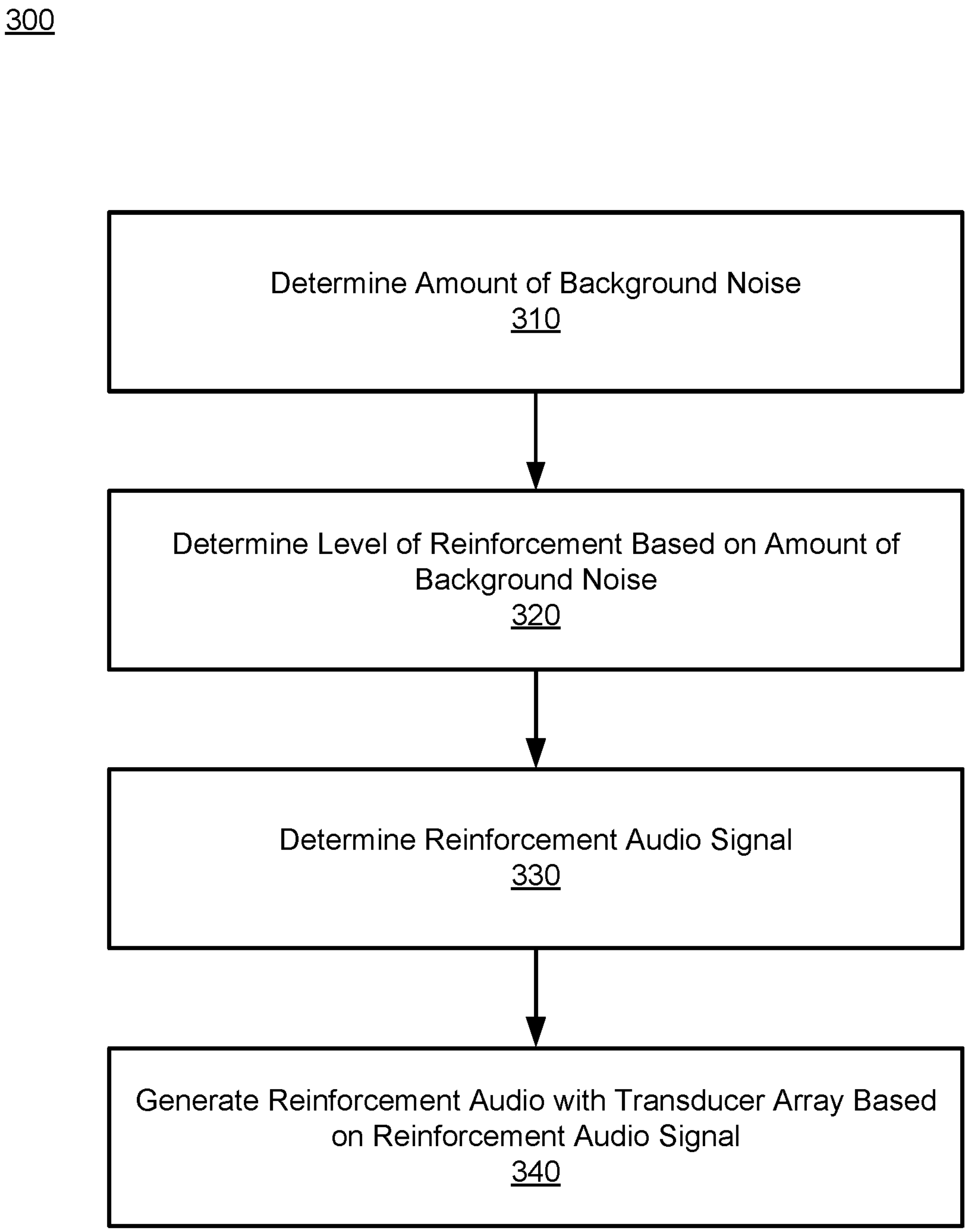
FIG. 3 is a flowchart of a method for adaptive reinforcement of a sound source, in accordance with one or more embodiments

FIG. 3 is a flowchart of a method 300 for adaptive reinforcement of a sound source, in accordance with one or more embodiments. The method shown in FIG. 3 may be performed by components of an audio system (e.g., audio system 200), such as by the sound reinforcement module 290. Other entities may perform some or all of the steps in FIG. 3 in other embodiments. Embodiments may include different and/or additional steps or may perform the steps in different orders.

As a general overview, the method 300 may include determining 310 an amount of background noise and determining 320 a level of reinforcement based on the amount of background noise. The level of reinforcement may be no reinforcement, e.g., in low-noise environments. The level of reinforcement may be applied to the target sound to determine 330 a reinforcement audio signal that may then be sent to the transducer array for generation 340 of the reinforcement audio signal to augment the sound source when heard by a user.

The method of FIG. 3 may also be performed dynamically, such that as different sounds are received by the audio system, the sounds are processed and the reinforcement audio signal may be generated and produced by the transducer array. The target sound source, the content of the associated target sound, as well as the amount of background noise may change over time, enabling the reinforcement audio signal to dynamically change with the environment. In some circumstances, the reinforcement audio signal may provide no reinforcement to the target sound source.

In further detail, the amount of background noise may be determined 310 by analysis of sound sources and background sound as discussed above. For example, the sound sources, directionality, type of sound source, room reverberation, etc., may be analyzed from the received audio of a sensor array from the local area. In some circumstances, the received sound may be analyzed to determine a sound source of interest and the remaining sound may be characterized as the background noise (e.g., as discussed above). The amount of background noise may be characterized in one or more frequencies or frequency ranges, and may be a maximum, average, or other mathematical characterization of the received sounds from non-target sources.

Next, the level of reinforcement for the target sounds is determined 320, at least in part, based on the amount of background noise. The level of reinforcement may be determined in a variety of ways and may include additional factors in addition to the amount of background noise. The particular input factors and resulting level of reinforcement for various values of the input factors may be referred to as a reinforcement profile. Portions of the reinforcement profile describing a combination of ranges of one or more input factors is referred to as a region of the reinforcement profile. An example reinforcement profile is shown in FIG. 4 and discussed below. In general, the reinforcement profile may enable dynamic reinforcement of the target sound source based on the amount of background noise, such that the reinforcement profile may include a region in which the level of reinforcement is at a maximum, a region in which the level of reinforcement is at a minimum (e.g., no reinforcement), and a region in which the level of reinforcement is between the minimum and the maximum.

The level of reinforcement may also vary for different frequencies. In some embodiments, the audio system determines multiple levels of reinforcement based on various sub-bands independent of each other, such that the levels may be applied to respective sub-bands of sound for the target sound source. In some embodiments, the levels of reinforcement of different sub-bands may not differ from each other by more than a maximum amount (e.g., 6 dB). The level of reinforcement (e.g., for different frequencies) may also be based in part on (or modified by) a hearing profile of the user. A hearing profile describes how well a user hears as a function of frequency. For example, if a user has difficulty hearing frequencies in a particular band, even if the background noise is low, the audio system may provide reinforcement within that particular band.

The factors used in the reinforcement profile may vary in different embodiments. In one example, the reinforcement profile may generally include regions that increase the reinforcement level as the amount of background noise increases, such that one amount of relatively lower background noise results in a lower reinforcement level than another amount of relatively higher background noise. As such, a minimal (or no) reinforcement level may be determined when the background noise is low, and a high reinforcement level is determined when the background noise is high.

Figure 4A:
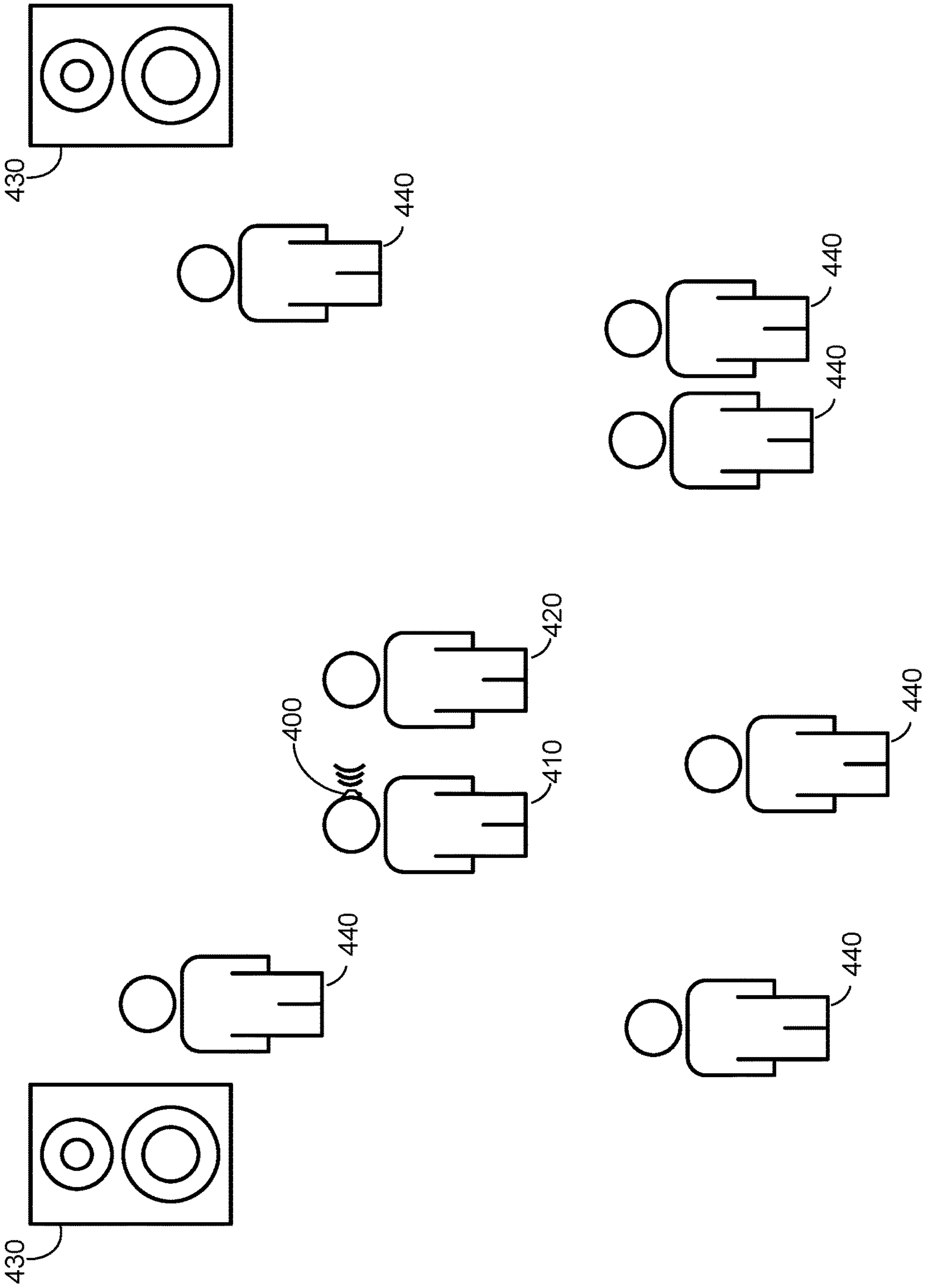
FIGS. 4A-B show environments in which the background noise may be used to augment target sound sources, according to one embodiment.
Figure 4B:
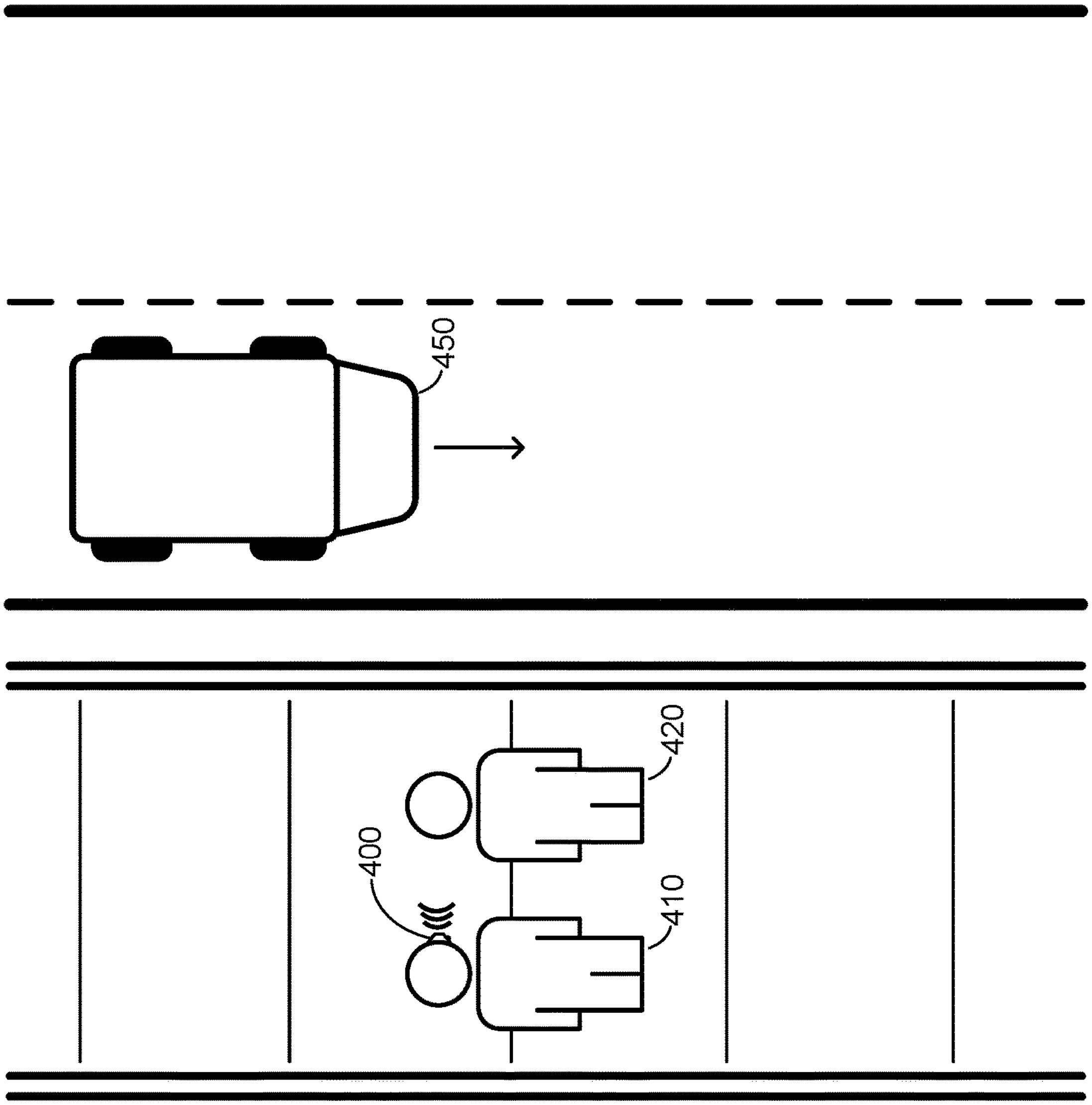

FIGS. 4A-B show environments in which the background noise may be used to augment target sound sources, according to one embodiment. As discussed above, the audio system may dynamically monitor the amount of background noise and dynamically update levels of reinforcement based on the monitored amount of background noise. A first environment shown in FIG. 4A shows a crowded bar in which an audio system 400 is worn by a user 410. The user 410 is talking with a friend 420, while additional sounds are created by speakers 430 as well as conversations by other persons 440. The amount of background noise in this environment may be relatively high. The audio system 400 captures the sound from these various sources and may analyze the received audio to determine various sound sources, including the friend 420 as a target sound source (e.g., based on the relative direction that sounds from the friend 420 are received). In this environment, the relatively high background noise may be used to set a relatively high level of reinforcement for the friend 420 as a target audio source, enabling the user 410 to hear the conversation with the friend 420 more effectively. If the background noise reduces (for example because the speakers 430 are turned off or volume of the other persons 440 reduces), the reduced background noise is identified by the audio system 400 and the level of reinforcement may dynamically reduced to account for the reduced background noise.

When the user 410 exits the more crowded environment shown in FIG. 4A and moves to a less crowded environment such as the street of FIG. 4B, the level of reinforcement may similarly reduce, for example, such that the audio system 400 may provide no reinforcement while the user is outside and the amount of background noise is very quiet. The audio system may continue to monitor sound sources in the local area and may use beamforming to track approaching sound sources that are background noise (e.g., approaching vehicle, loud group of people, etc.). When a vehicle 450 approaches, the audio system 400 can dynamically increase the level of reinforcement of the voice of the friend 420. Accordingly, the reinforcement can dynamically increase as the amount of background noise increases (e.g., as the vehicle 450 approaches or the crowd in a bar increases), and can then dynamically reduce the amount of reinforcement of the voice of the friend 420 as the level of background noise decreases (e.g., as the vehicle 450 passes and moves away from the user 410 or the crowd in a bar decreases).

In some embodiments, the audio system may coordinate with sound sources in the local area that are also using an audio system. For example, the audio system may be communicatively coupled to other audio systems in the local area. In some embodiments, the audio system may establish that a sound source the user is speaking to is also wearing an audio system. The audio system may adjust a level of reinforcement such that each user may speak more quietly and still be heard by the other (e.g., by increasing the level of reinforcement). Thus, the users can have a more private conversation since the level of reinforcement is adjusted based on the overall state of the conversation and the audio systems.

Figure 5:
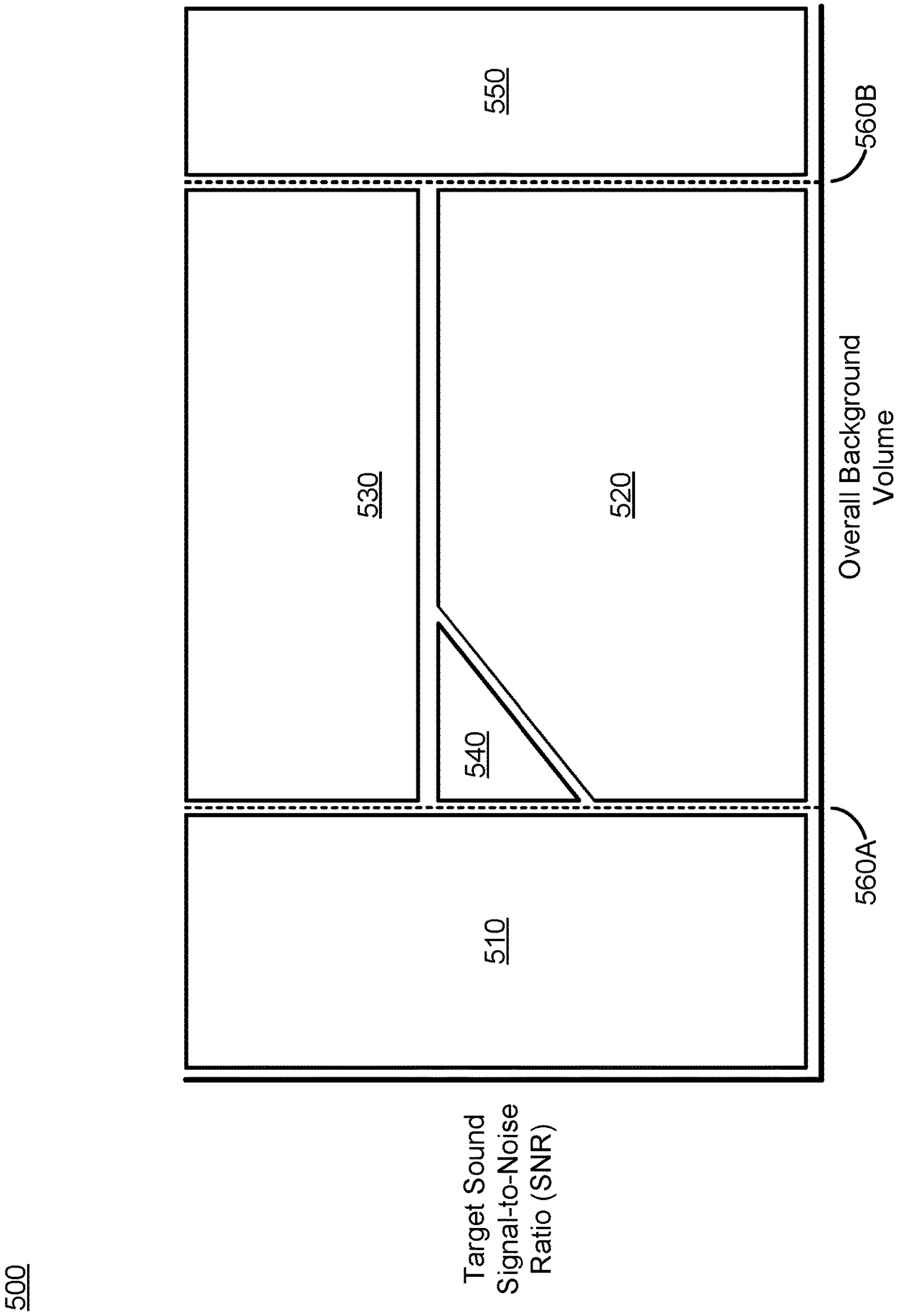
FIG. 5 is an example reinforcement profile that can be applied by the audio system to determine a level of reinforcement to be applied based in part on the background noise, according to one embodiment.

FIG. 5 is an example reinforcement profile 500 that can be applied by the audio system to determine a level of reinforcement to be applied based in part on the background noise, according to one embodiment. The particular reinforcement profile may also be based on the type of background noise or environment among other factors (e.g., road noise, pub noise, etc.).

In the example of FIG. 5, the reinforcement profile 500 determines a level of reinforcement as a function of the amount of background noise (e.g., an overall background volume) and a signal-to-noise ratio (SNR) of the target sound relative to the amount of background noise. The signal-to-noise ratio may be determined by dividing the target sound by the amount of background noise. In this example, the background volume increases towards the right of the chart, while the SNR increases from bottom to the top of the chart.

In a first region 510, the amount of background noise is relatively low, e.g., below a first threshold 560A. At these relatively low amounts of background noise, the reinforcement level may be set to a minimum (e.g., no reinforcement). In this state, there may be no reinforcement because the background noise is so low that there is no need for reinforcement and any playback would be detrimental. There may be regions in which the reinforcement level at the same background volume differs based on the SNR. For example, in this embodiment, in a second region 520 of a background noise above the first threshold 560A but below a second threshold 560B, the reinforcement level may be high to enable the target sound to be heard. In the second region 520, the background noise is present, but with an insufficient existing target sound (e.g., a lower signal-to-noise ratio for the target sound) so the reinforcement level may be set to reinforce the target sound. Above a specified SNR with background noise between the first threshold 560A and second threshold 560B, shown as a third region 530, although there is some amount of background noise, because the target sound may already be relatively high relative to the background noise (characterized by the high SNR), the level of reinforcement may be set to a low or minimum level. This may represent, for example, a moderately noisy environment in which a conversational partner is already speaking at an adequately higher volume to be heard well. In this example, in a fourth region 540, the background volume is above the first threshold 560A, but the signal-to-noise ratio is relatively high. In this fourth region 540, a level of reinforcement may be set between a minimum and maximum level. The fourth region 540 may represent a moderately loud environment where a speaker is speaking loud enough to be heard, but not well or consistently, such that modest reinforcement will aid in understanding the speaker. The size and shape of the fourth region 540 may also vary in different embodiments, enabling the reinforcement to be partially applied as a function of the background noise and/or the SNR of the target sound.

A fifth region 550 indicates an environment with particularly high background noise. In this example, reinforcement may be applied at a maximum for all SNR of the target sound, aiding in the distinction of the target sound given the higher background noise. As another example, in the fifth region 550 or another region (e.g., at an even higher background noise level), rather than increasing the level of reinforcement, the amount of background noise may indicate that the device cannot effectively distinguish the target sound from the background noise, such that the reinforcement level may be set to a minimum to preserve battery or power for the audio system while the background noise is high. This may also be beneficial for reducing the maximum sound provided to a user (e.g., including the existing environmental sounds) in high-noise environments.

In some embodiments, the reinforcement profile shown in FIG. 5 may be modified by the user, for example via a configuration or setup feature of an audio system. This information could further be stored in the cloud and user across devices. This may further benefit users who are hard of hearing, for example, to modify the size of the first region 510 by reducing the first threshold 560A at which the reinforcement may be applied. This may enable reinforcement to turn on even in low background noise environments, to assist with hearing loss issues.

In addition to the signal-to-noise ratio discussed in FIG. 5, the reinforcement level may also be determined based on various additional factors, such as: a type of environment (indoor or outdoor), a type of the target sound source (speaking, music, etc.), a language of the target sound source (e.g., expected frequency ranges), frequencies of the background noise (e.g., a spectral profile of the background noise), similarity of the background noise frequency to the target sound frequency, room acoustics, and so forth. In general, these factors may be applied adaptively to generally increase the distinctiveness of the target sound relative to the background noise when conditions may make the target sound otherwise difficult to distinguish. For example, some types of sounds may be easy to distinguish (e.g., certain frequencies that differ from the background frequency) and may have a reduced reinforcement level.

As another example, the reinforcement level may also be affected by the battery or power remaining to the audio system. The determination of sound sources, identification of target sound sources and target sound may be relatively power-intensive, the reinforcement level may be affected by the remaining power, such that the reinforcement level is reduced (e.g., for the same amount of background noise) when the battery is low.

Returning to FIG. 3, the level of reinforcement may then be applied to determine 330 the reinforcement audio signal. The reinforcement audio signal is generated by applying the level of reinforcement to the target sound, such that the reinforcement audio signal, when produced by the transducer array, provides an amplification of the target sound that may reinforce the target sound to the user. The target sound may be determined in multiple ways as also discussed above (e.g., with respect to DOA estimation module 240 and beamforming module 270). In one embodiment, the target sound may be an isolated portion of the received audio associated with the target sound source. In further embodiments, the target sound may be the sounds within a particular frequency band. The target sound may also be determined based on beamforming or direction of a sound source. As noted above, the level of reinforcement may include different levels for different frequencies, such that the respective frequencies of the target sound may be increased by the respective level of reinforcement. Finally, the reinforcement audio signal is sent to the transducer array that generates 340 the reinforcement audio and augments the target sound for the user. As such, the level of reinforcement may dynamically change based on various factors in the environment, including the background noise, and allow effective support for target sounds without requiring moment-to-moment user intervention.

Figure 6:
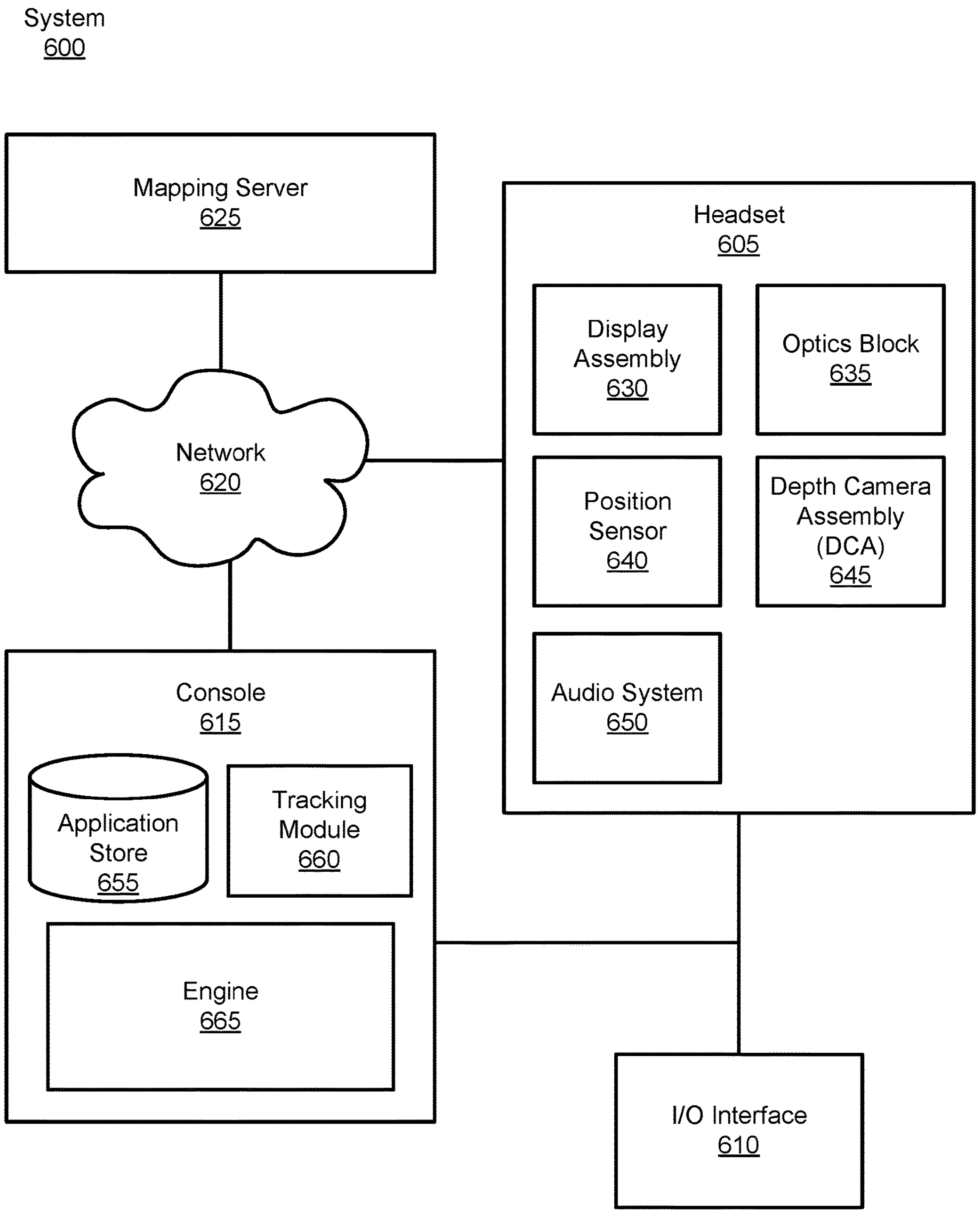
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is substantially the same as the audio system 200 describe above. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

ADDITIONAL CONFIGURATION INFORMATION

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An audio system comprising:

a sensor array configured to capture sound from a local area;

a controller configured to:

localize each particular sound, of multiple sounds in the captured sound, based on:

identified values, for a given sound feature, as differently measured by at least two sensors in the sensor array, and/or visual information, received from a headset associated with the audio system, indicating location changes for the particular sound, identify, based at least in part on the localization for the multiple sounds, A) someone speaking as a sound source in the captured sound and B) background noise, determine an amount of the background noise in the captured sound, determine a level of reinforcement to be applied to at least the sound source based in part on the amount of the background noise, and generate a reinforcement audio signal based on the level of reinforcement; and a transducer array configured to generate reinforcement audio for the sound from the sound source based on the reinforcement audio signal.

2. The audio system of claim 1, wherein the level of reinforcement increases when the amount of background noise increases.

3. The audio system of claim 1, wherein the controller is further configured to isolate sound from the sound source and the reinforcement audio is based on the isolated sound from the sound source.

4. The audio system of claim 1, wherein the localizing each particular sound includes creating a virtual model of a local area in which the audio system and the multiple sounds are mapped.

5. The audio system of claim 1, wherein the localizing at least one of the multiple sounds is based on the identified values, for the given sound feature, as differently measured by the at least two sensors in the sensor array, and wherein the given sound feature is one of: intensity, spectra, and/or arrival time.

6. The audio system of claim 1, wherein the controller is further configured to identify sound from the sound source based on a language of the sound source.

7. The audio system of claim 1, wherein the localizing at least one of the multiple sounds is based on the visual information, received from the headset associated with the audio system, indicating location changes for the particular sound.

8. The audio system of claim 1, wherein the localizing at least one of the multiple sounds is based on the identified values, for the given sound feature, as differently measured by the at least two sensors in the sensor array.

9. The audio system of claim 1, wherein the controller is further configured to determine an environment type of the local area based on the captured sound and the level of reinforcement is further determined based on the environment type.

10. The audio system of claim 1, wherein the level of reinforcement is further based on a signal-to-noise ratio of the sound from the sound source relative to the amount of background noise.

11. A method comprising:

localizing each particular sound, of multiple sounds in captured sound from a sensor array, based on:

identified values, for a given sound feature, as differently measured by at least two sensors in the sensor array, and/or visual information, received from a headset, indicating location changes for the particular sound;

identifying, based at least in part on the localization for the multiple sounds, A) a sound source in the captured sound and B) background noise, determining an amount of the background noise in the captured sound;

determining a level of reinforcement to be applied to at least the sound source based in part on the amount of the background noise;

generating a reinforcement audio signal based on the level of reinforcement; and sending the reinforcement audio signal to a transducer array for generation of a reinforcement audio for the sound from the sound source.

12. The method of claim 11, wherein the level of reinforcement increases when the amount of background noise increases.

13. The method of claim 11, further comprising isolating sound from the sound source and the reinforcement audio is based on the isolated sound from the sound source.

14. The method of claim 11, wherein the localizing each particular sound includes creating a virtual model of a local area in which the audio system and the multiple sounds are mapped.

15. The method of claim 11, wherein the localizing at least one of the multiple sounds is based on the identified values, for the given sound feature, as differently measured by the at least two sensors in the sensor array, and wherein the given sound feature is one of: intensity, spectra, and/or arrival time.

16. The method of claim 11, further comprising identifying sound from the sound source based on a language of the sound source.

17. The method of claim 11, wherein the localizing at least one of the multiple sounds is based on the visual information, received from the headset associated with the audio system, indicating location changes for the particular sound.

18. The method of claim 11, wherein the localizing at least one of the multiple sounds is based on the identified values, for the given sound feature, as differently measured by the at least two sensors in the sensor array.

19. The method of claim 11, further comprising determining an environment type based on the captured sound and the level of reinforcement is further determined based on the environment type.

20. The method of claim 11, wherein the level of reinforcement is further based on a signal-to-noise ratio of the sound from the sound source relative to the amount of background noise.

* * * * *